United States Patent [19]

Lewis

[11] 4,032,614

[45] June 28, 1977

[54] PROCESS FOR THE DISPOSAL OF ALKALI METALS

[75] Inventor: Leroy C. Lewis, Arco, Idaho

[73] Assignee: The United States of America as represented by the United States Energy Research and Development Administration, Washington, D.C.

[22] Filed: Oct. 20, 1975

[21] Appl. No.: 624,030

[52] U.S. Cl. ............................. 423/179; 423/641
[51] Int. Cl.² ........................................ C01D 1/04
[58] Field of Search .................. 423/198, 641, 179

[56] References Cited

UNITED STATES PATENTS

| | | | |
|---|---|---|---|
| 2,527,443 | 10/1950 | Padgitt | 423/641 |
| 2,660,517 | 11/1953 | Padgitt | 423/641 |
| 2,880,065 | 3/1959 | King et al. | 423/641 |
| 3,459,493 | 8/1969 | Ross | 423/641 |

*Primary Examiner*—O. R. Vertiz
*Assistant Examiner*—Wayne A. Langel
*Attorney, Agent, or Firm*—Dean E. Carlson; Frank H. Jackson; James W. Weinberger

[57] ABSTRACT

Large quantities of alkali metals may be safely reacted for ultimate disposal by contact with a hot concentrated caustic solution. The alkali metals react with water in the caustic solution in a controlled reaction while steam dilutes the hydrogen formed by the reaction to a safe level.

6 Claims, No Drawings

PROCESS FOR THE DISPOSAL OF ALKALI METALS

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

This invention relates to a method for safely disposing of alkali metals.

The disposal of small quantities of highly reactive alkali metals is a simple process, for they can be easily reacted with water to form the alkali metal hydroxide and hydrogen gas which is quickly diluted with air and dispersed. The metal hydroxide so formed may then be solidified and stored or perhaps used as a chemical reagent.

The advent of liquid-metal-cooled nuclear reactors has brought new, previously unthought of, problems which must be considered when disposing of alkali metals. These reactors, which are cooled with liquid sodium or with a liquid eutectic sodium-potassium alloy (NaK), contain many thousands of gallons of these highly reactive metals which must be rendered relatively harmless before they can be stored or otherwise disposed of. The problems are now magnified many times, for not only are there very large quantities of material to dispose of, but there is also the problem that the material is often radioactive due to its long-time exposure to radiation within the reactor.

Heretofore the disposal of a large quantity of alkali metal has taken place by dumping it either on the ground or into the ocean and relying on the vast quantities of water to dilute the caustic so formed and the ocean air to quickly dilute the hydrogen concentration to a safe level. However, this is no longer a reasonable means for disposal of these metals because of the overall effects of the pollution on the ocean and on the general environment.

SUMMARY OF THE INVENTION

I have developed a process for the disposal of large quantities of alkali metals which eliminates many of the above-enumerated problems and by which the release of any radioactivity to the environment can be readily controlled. I have found that, by contacting the alkali metal with a concentrated caustic solution, the rate and violence of the reaction is much slower and can readily be controlled since the liquid metal must compete with the caustic for water. Thus, by this method for disposing of alkali metals, an aqueous disposal solution of at least 55 weight percent (w/o) metal hydroxide is prepared and molten alkali metal is sprayed into this disposal solution, producing in a controlled reaction, alkali metal hydroxide, hydrogen and heat, forming a mixture of alkali metal hydroxides. Water is added to the mixture in amounts sufficient to maintain the concentration of metal hydroxides at about 70 to 90 w/o and the temperature at about the boiling point of the solution. The alkali metal hydroxide mixture is then removed and cooled for storage or other disposition.

By providing proper devices to filter the off-gas consisting of steam, water vapor and diluted hydrogen gas, it is possible to remove any radioactive material which may be vaporized by the reaction, thus preventing the release of any such radioactivity into the environment. The alkali metal hydroxide mixture, while still molten, can be placed into large metal drums, cooled to ambient temperature, and stored for substantial periods of time, which may be necessary should the mixture contain some radioactive material. By continuously spraying molten alkali metal into the mixture, adding water to maintain the desired temperature and concentration limits while recovering the concentrated alkali metal mixture, large quantities of alkali metals can be safely disposed of in relatively short periods of time.

It is therefore one object of the method of this invention to provide a safe method for the disposal of large quantities of alkali metals.

It is another object of the invention to provide a safe method for the disposal of radioactive alkali metals.

It is a further object of the invention to provide a method for the safe disposal of radioactive sodium, potassium and mixtures thereof.

DESCRIPTION OF THE PREFERRED EMBODIMENT

These and other objects of the invention for the disposal of alkali metals may be met by preparing an aqueous disposal solution containing 70 to 90 w/o alkali metal hydroxide which may be sodium hydroxide, potassium hydroxide or a mixture of sodium and potassium hydroxide, heating the disposal solution to melting temperature, melting the alkali metal to form a feed solution and spraying the molten feed solution into the hot disposal solution to react the alkali metal with the water in the disposal solution, in a controlled reaction, forming an alkali metal hydroxide mixture, hydrogen and heat. Water is added to the mixture to maintain the concentration of alkali metal hydroxides at 70 to 90 w/o and the temperature of the mixture at about 200° to 220° C.

The disposal solution may be prepared from any alkali metal hydroxide although sodium hydroxide, potassium hydroxide and mixtures of sodium and potassium hydroxide are most readily available. It is preferred that the solution contain from about 70 to 90 w/o of the alkali metal hydroxide in order to limit the amount of water which is available at any one time for reaction with the alkali metal. However, it is convenient to start out the process with a solution containing about 55 w/o hydroxide and permit the concentration of the mixed hydroxides to increase to 70 to 90 w/o and then to maintain the concentration at that level.

The temperatures of the process will depend upon the concentration of the hydroxides in the solution. The disposal solutions must be in a liquid state before the alkali metal can be sprayed into them. Thus, while a disposal solution containing about 55 w/o hydroxide is liquid at ambient temperature, solutions of 70 to 90 w/o hydroxide must be heated to at least melting temperature before contact with the alkali metal. The reaction will produce additional heat and it is preferred that the temperature during the balance of the process be maintained at about the boiling point of mixed hydroxide solution. For a 90% hydroxide mixture this is a temperature about 200° to 220° C.

It is important that during the process water be added to the hydroxides mixture in amounts sufficient to maintain the concentration of the mixed hydroxides at about 70 to 90 w/o and to control the temperature of the solution to about the boiling point of the mixture.

The alkali metal hydroxide mixture which is recovered from the process for cooling and subsequent disposal may vary in concentration from 70 to 90 w/o hydroxide; however, about 90% is more preferred, forming a single solid phase which is more stable for storage which contains 1 mole of water per mole of alkali metal hydroxide.

Any of the alkali metals may be disposed of by this method. The method is particularly useful for the disposal of sodium, potassium and mixtures of sodium and potassium which may have been used in liquid-metal-cooled nuclear reactors. The metals need be heated only to the melting temperature so that they can be sprayed into the aqueous disposal solution.

Contact of the alkali metals with the disposal solution is by spraying the molten metals directly into the solution. Spraying produces a small sized droplet which is dispersed through a wide area of the solution and thus controls the rate of reaction.

The following example is given as illustrative of the method of the invention and is not to be taken as limiting the scope of the invention which will be defined by the hereinafter appended claims.

EXAMPLE

5500 Gallons of a eutectic sodium-potassium alloy (NaK) which included 1100 gallons of uncontaminated NaK and 4400 gallons of NaK contaminated with about 16 curies of $^{137}$Cs and 2.1 mCi or $^{90}$Sr was disposed of by reacting it by the method of this invention. A carbon steel reaction vessel was filled with 100 gallons of 14 molar (70%) sodium hydroxide to form the aqueous waste-disposal solution. A flow of molten NaK at a rate of 125 liters per hour was added to this waste-disposal solution by spraying through two atomizing nozzles fabricated from Type 304 stainless steel (in this instance, the waste-disposal solution was not heated, but heating resulting from the reaction of the NaK with the water was relied on to provide the proper temperature). As the temperature increased, water was added to the solution at a rate of about 255 liters per hour to maintain the temperature at between 200° and 220° C. and also to maintain the concentration of the caustic solution at between 14 and 25 molar (70 to 90%). As the reaction continued, the mixture of the concentrated alkali metal hydroxide and reacted NaK feed solution was removed from the reaction vessel at a rate of about 128 liters per hour. The off-gas from the reaction was filtered and released to the atmosphere via a flare stack for disposal of the hydrogen gas equipped with a back-flash arrestor. A flow sheet for the reaction is given in the table below.

|  | NaK Feed | Water Addition | Caustic Product | Off-Gas |
|---|---|---|---|---|
| Flowrate | 125 l/hr | 255 l/hr | 128 l/hr | 172 scfm |
| NaK, M | 25.6 | — | 25 | — |
| $H_2$ Vol. % | — | — | — | 12% |
| $H_2O$ (Vapor) Vol. % | — | — | — | 83% |
| $N_2$ Vol. % | — | — | — | 5% |

By this method, a total of 5500 gallons of NaK were successfully reacted and disposed of with a minimum number of problems and with no contamination of the atmosphere from the radioactivity due to the $^{137}$Cs, part of which remained in the solid concentrated waste material and part of which was recovered in the filtering system for the off-gas.

As can be seen by the above description and example, the method of this invention for the disposal of alkali metals is a safe and effective method for the disposal of large quantities of reactive material.

The embodiments of the invention in which an exclusive property or privilege is claimed are defined as follows:

1. A method for disposing of alkali metals by forming a solid waste for storage comprising:
   a. preparing an aqueous disposal solution of at least 55 weight percent alkali metal hydroxide;
   b. heating the alkali metal to melting temperature to form a feed solution;
   c. spraying the molten feed solution into the disposal solution, the alkali metal reacting with the water in the disposal solution in a controlled reaction producing alkali metal hydroxide, hydrogen and heat, thereby forming a solution of alkali metal hydroxides;
   d. adding water to the solution in amounts sufficient to maintain the concentration of alkali metal hydroxides in the solution at 70 to 90 weight percent and to maintain the temperature of the solution at about the boiling point; and
   e. removing and cooling the alkali metal hydroxide solution thereby forming a solid waste for storage.

2. The method of claim 1 wherein the disposal solution is prepared from an alkali metal hydroxide selected from the group consisting of sodium, potassium and mixtures of sodium and potassium hydroxides.

3. The method of claim 2 wherein the alkali metal is selected from the group consisting of sodium, potassium and mixtures of sodium and potassium.

4. The method of claim 3 wherein the disposal solution is initially 70 to 90 weight percent in alkali metal hydroxide and including the additional step of heating the disposal solution to at least melting temperature before spraying the feed solution into it.

5. The method of claim 4 wherein the temperature of the alkali metal hydroxides solution is maintained at about 200° to 220° C.

6. The method of claim 5 wherein the alkali metal hydroxides solution that is removed and cooled is about 90 weight percent in alkali metal hydroxides.

* * * * *